United States Patent Office 3,006,991
Patented Oct. 31, 1961

3,006,991
SIGNAL TRANSMISSION SYSTEMS
Edward Colin Cherry, Shere, Dennis Godson Holloway, Maidenhead, and Birendra Prasada, London, England, assignors to National Research Development Corporation, London, England
Filed Oct. 2, 1959, Ser. No. 844,106
Claims priority, application Great Britain Oct. 10, 1958
7 Claims. (Cl. 178—6)

This invention relates to signal transmission systems. The invention may provide advantages generally in circumstances where it is desired to transmit a signal comprising periods of high information content and other periods of low information content by a transmission channel of insufficient information capacity to accommodate the signal periods of high information content. The invention therefore has particular application to television systems and to picture facsimile systems.

In such systems the quality of the reproduced picture is a function of the information capacity of the channel by which the picture signal is transmitted. In an analogue transmitting channel, as at present commonly in use, in which the picture information is transmitted as a signal of varying amplitude, the information capacity of the channel is determined by the bandwidth of the channel for given transmission conditions such as noise level. This channel bandwidth needs to be high for the accurate reproduction of sharp transitions in brightness which occur, for example, at the boundary of surfaces of different brightness.

It is well known that the bandwidth required by a conventional television system is greatly in excess of the minimum bandwidth theoretically required by the information content of the picture transmitted. This is due to the fact that no real picture, having meaning to an observer, consists of a continuous rapid succession of brightness transitions. Normally, it is made up, for the main part, of areas of relatively constant brightness.

It follows, therefore, that there exists the possibility of reproducing a television picture of the same definition as the picture provided by the conventional television system, but using a transmission channel of smaller bandwidth.

Alternatively, there exists the possibility of retaining the same bandwidth of a picture signal transmission channel and transmitting the picture information more quickly. This latter possibility is of particular relevance to facsimile picture transmission systems.

In a digital information transmitting channel, such for example as a channel in which the picture information is transmitted by a pulse code modulated carrier, the full picture detail can be transmitted by a channel of lower information capacity than that required to transmit signals corresponding to the higher than average picture details.

The object of the present invention is to provide a signal transmission system for transmitting a signal having periods of high information content and periods of low information content by a transmitting channel of restricted information capacity, or more quickly by a conventional transmitting channel of sufficient information capacity for a continuous signal of high information content.

According to one form of the present invention, in a signal transmission system for transmitting a signal having periods of high information content and periods of low information content by a transmitting channel of insufficient information capacity to accommodate the signal during periods of high information content, the transmitter comprises means for coding the said signal into pulse form and means for expanding in time the signal relating to periods of high information content and preferably for compressing the signal relating to periods of low information content to provide a signal which is rearranged in time to contain a more uniform distribution of information in time.

This re-coded signal which has been so rearranged in time, may then be transmitted by the channel of restricted information capacity together with information defining the re-coding of the signal. The receiver of the system may comprise means, controlled according to the information defining the re-coding, for restoring the signal as transmitted to substantially its original form.

According to one embodiment of this form of the invention, the original signal is converted into amplitude modulated pulses irregularly spaced in time, signal periods of high information content providing more frequent pulses and signal periods of low information content providing less frequent pulses, the said more frequent pulses then being transmitted at a slower rate than they are produced and the said less frequent pulses being transmitted at a faster rate than they are produced, together with a data signal defining the displacements in time of pulses. One form of receiver according to this form of the invention comprises means for restoring the original pulse spacing.

Conveniently, the compression or expansion of the signal, providing re-coding of the pulses, is effected by passing consecutive pulses through one or more delay devices to provide a different delay of the individual pulses. If the delay between consecutive pulses is made progressively shorter, the signal is thereby compressed on a time scale and if it is made progressively longer, the signal is thereby expanded on a time scale. If, at the receiver, each pulse is passed through a complementary delay device, so that the sum of the delay at the transmitter and the delay at the receiver is substantially the same for every pulse, the original pulse signal at the transmitter can be reproduced.

In order that the invention may be readily carried into effect, one embodiment of the invention together with several modifications of parts thereof will now be described in detail, by way of example, with reference to the accompanying drawings, of which.

Figure 1:
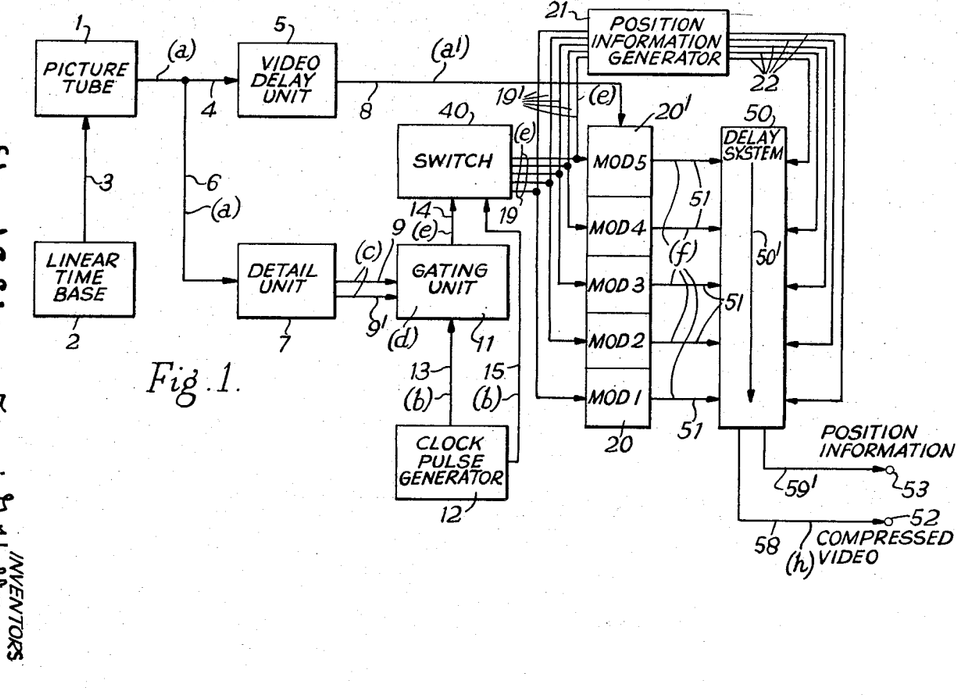
FIG. 1 is a block schematic diagram of the transmitter part of a television system.

FIG. 1 shows the transmitter end of a television system providing, in this example, a 405 line picture scan and a picture signal of 3 mc./s. bandwidth. Picture information corresponding to this bandwidth of 3 mc./s. is transmitted over a channel of smaller bandwidth than 3 mc./s. This is made possible by using a linear scanning in the picture tube and by sampling the signal obtained at a high rate or a low rate, depending upon weather the corresponding picture area is one of high detail or one of low detail. Those samples of high detail picture areas are expanded in time so that a greater time interval is taken to transmit such parts of the signal than was taken to produce them. Parts of the picture signal having low detail are correspondingly compressed in time. The compression of the low detail signal parts is complementary to the expansion of the high detail signal parts, taking an average over a period of time, so that the picture signal is transmitted substantially within the same total time interval as it is produced.

At the receiver end of the system the original picture signal, as it exists at the transmitter before re-coding, is closely reproduced. This is effected by also transmitting data defining the extent of compression or expansion of the various signal parts. This data is transmitted by a signal which is separate from the modified picture signal. The various signal forms are later described with reference to FIG. 2a to 2j and in FIG. 1 the corresponding signals are indicated at the various parts of the circuit by the bracketed lower-case letters which correspond to FIG. 2.

In FIG. 1, a picture tube 1 is arranged for interlaced scanning of a picture to be transmitted with 202½ lines per frame. The picture tube 1 may be a television camera tube which scans an actual scene, or a television tube which scans a series of pictures of cinematograph film or scans a single still picture. Its form is immaterial to the present invention but it may conveniently comprise a photo-electric mosaic which is scanned by an electron beam. The scanning operation is controlled by a linear time base 2 provided with connections 3 to the picture tube 1. The picture tube 1 provides a conventional picture signal (a), varying in amplitude with time, which is supplied by a line 5 to a delay unit 5 and by way of a line 6 to a detail unit 7. The delayed picture signal (a') from the delay unit 5 is supplied by a line 8 to every modulator of a bank of modulators 20.

The detail unit 7 examines the picture signal waveform and evaluates continuously the amount of picture signal detail. This is evaluated at one of three levels, high, medium and low, and the detail unit 7 provides a detail data signal representative of the detail level at any time. This detail data signal is generated as a signal on both, one or neither of two lines 9' and 9, corresponding to the high, medium and low detail levels respectively. The detail data signal is supplied to a gating unit 11.

A clock pulse generator 12 generates pulses at a fixed repetition frequency and constant amplitude. These pulses are fed by a line 13 to the gating unit 11. The gating unit 11, under control of the detail data signal passes all the clock pulses for a high-detail signal, every third clock pulse for medium-detail signal, and every ninth clock pulse for a low-detail signal. These selected pulses are later used as a picture signal sampling pulses and are fed by a line 14 to a multiple position switch 40. A second input to the switch 40 is supplied with the clock pulses by way of a line 15.

The switch 40 ascertains whether or not a signal sampling pulse is present for each clock pulse and the position of the switch 40 is controlled according to whether each clock pulse position is occupied by a sampling pulse or is empty. If every third clock pulse position is occupied, the switch 40 remains in whatever position it has previously taken up. If every clock pulse position is occupied, the switch 40 moves in one sense and if every ninth position is occupied, it moves in the reverse sense.

The switch 40 is thus adapted to connect the input on line 14 to any one of a number of output lines 19, of which only five are shown in FIG. 1. Each of the lines 19 is connected to one of two inputs of a modulator forming part of a bank of modulators 20. Five such modulators are shown in FIG. 1. The line 8 is connected to the second input of all the modulators of the bank.

Each modulator of the bank 20 has an output which is connected by a corresponding line 51 to a corresponding input of a delay system 50. The delay system 50 is provided with two output lines 58 and 59 connected respectively to output terminals 52 and 53.

Any signal introduced into the delay system 50 travels to the output thereof in the direction of the arrow 50'. Each input 51 to the delay system 50 corresponds to a different total delay through the system, there being a constant delay difference $d$ between any two consecutive input lines. In FIG. 1, which shows five positions of switch 40, five modulators in the bank 20 and five inputs to the delay system 50, a signal by way of modulator 5 (at the top of the bank 20) undergoes the greatest delay and a signal by way of modulator 1 (at the bottom of the bank) the least delay.

Movement of the position of switch 40 in the sense towards modulator 5 progressively increases the total delay which the picture signal undergoes and the picture signal is thereby expanded in time. Movement of the position of switch 40 in the sense towards modulator 1 progressively decreases the total delay and the picture signal is thereby compressed in time.

The compressed or expanded picture signal is supplied by line 58 to output terminal 52.

Each line 19 from the switch 40 has a branch 19' which is connected to a position information generator 21. The information defining the position of switch 40 is available on the lines 19' collectively in the form of a pulse, a sampling pulse of FIG. 2e, on that line 19' corresponding to the switch position. The information in this form has to be converted into a signal in a single channel, since it is economic to use a single channel to carry this informaiton to the receiver.

It will be evident that this conversion can be performed in a number of different ways. The actual switch position can be identified by a pulse code signal or by a variable amplitude signal having a number of amplitude levels corresponding to the number of switch positions.

Alternatively, the detail levels may be identified by a three-level signal corresponding to the signal of FIG. 2c, because these levels determine whether change of the switch position is required and in which sense. As a further alternative, a signal of one polarity may indicate switch position change in one sense, a signal of opposite polarity switch change in the opposite sense and no signal indicate no switch position change. However, with these alternatives, errors of switch position signal produce cumulative errors of switch position in the receiver.

In the present example, the switch position is identified positively by a multiple-level amplitude signal which is developed by the generator 21 and fed by the output line 22, corresponding to the live input 19', to a second corresponding input of the delay system 50. Line 59 supplies the correspondingly delayed position information to terminal 53.

Figure 2:
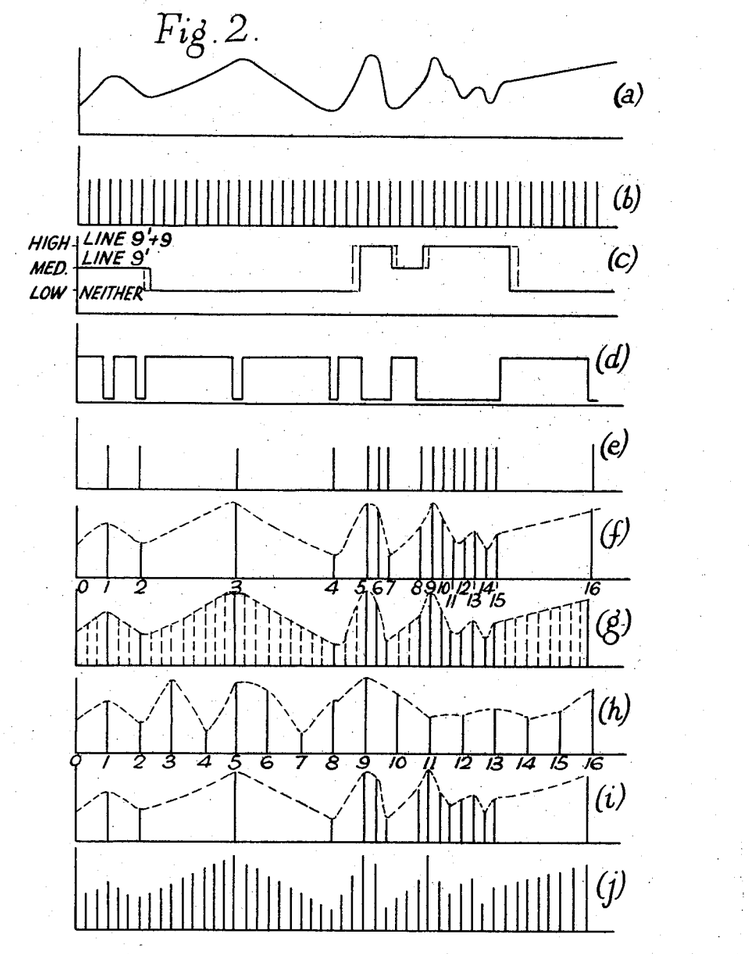
FIGS. 2a to 2j show a series of picture signal and related diagrams referred to in the explanation of the arrangements of FIG. 1 and FIG. 3.

Referring now to FIG. 2, the various curves and pulse sequences represented therein refer to the same part of a picture signal. The output signal of the picture tube 1 is a signal varying in amplitude with time as represented by FIG. 2a. Regions of rapid change in signal amplitude correspond to picture areas of high detail and regions of slow change in signal amplitude correspond to picture areas of low detail.

In the system now described, three levels of detail are recognised and these are referred to as high-, medium-, and low-detail levels. In FIG. 2a, a number of points of transition from one detail level to another are indicated by superimposed V's. The portion of the signal shown commences with a region of medium detail followed by a region of low detail, followed by one of medium detail, followed by one of high detail, finally returning to one of medium detail.

According to the Sampling Theorem, which is defined in "The Mathematical Theory of Communication" by C. E. Shannon, published by University of Illinois Press, Urbana, 1949, and in other publications, a wave is completely defined by uniformly spaced pulse samples of amplitude corresponding to the wave amplitude at the instant of the pulse, the pulses being spaced by intervals of $$\frac{1}{2W}$$

where W is the bandwidth. As previously stated, the present system is adapted to a bandwidth of 3 mc./s. Accordingly, the pulses produced by the clock pulse generator 12 are spaced at ⅙ micro-second intervals, that is they have a repetition frequency of 6 mc./s. These clock pulses are represented in FIG. 2b and the said interval is indicated at "T" in one case.

The detail unit 7 receives the signal of FIG. 2a. The detail unit examines the picture signal waveform continuously and provides detail data output signals which define whether the picture detail is medium, high or low at the time.

In FIG. 2c the picture detail levels of the signal of FIG. 2a are indicated. The highest line represents the high detail level and a data signal on both lines 9' and 9. The lowest line represents the low detail level and a data signal on neither line 9' nor 9 and the intermediate line represents the medium level with a data signal on line 9' only. It should be noted that picture detail does not generally change exactly coincidently with the signal pulses but may change at any time during the immediately preceding interval "T." This variation is indicated by the dotted line intervals in FIG. 2c.

Evaluation of the picture detail results in a certain time delay in the picture detail unit 7. The delay unit 5 introduces the corresponding delay into the picture signal transmission part 4—8.

The gating unit 11, which is described in greater detail later herein, is controlled by the detail data signals on lines 9' and 9 and generates internally a clock pulse suppression waveform of varying duration according to the controlling detail data signal. When the picture detail level is low, the suppression waveform is of duration 8T and is repeated after an interval of T. Hence, so long as the picture detail is low, eight clock pulses are suppressed and every ninth pulse only is passed by line 14 to switch 40. When the picture detail level is medium, the suppression waveform is of duration 2T and is repeated after an interval of T. Hence, so long as the picture detail is medium, two clock pulses are suppressed and every third pulse only is passed. When the picture detail level is high, no suppression waveform is developed. Hence, so long as the picture detail level is high, every clock pulse is passed to the switch 40. The suppression waveform corresponding to the picture signal of FIG. 1a is shown in FIG. 1d.

For the signal of FIG. 2a the output pulses on line 14 from the gating unit 11 are shown at FIG. 2e and it will be seen that the intervals occupied by pulses occurring at three different repetition rates correspond to the regions of different picture detail bounded by the V's in FIG. 2a.

The delayed picture signal (a') is supplied at all times to all the modulators 20' of modulator bank 20. However, no modulator 20' is able to supply an output signal except by reason of, and for the duration of, an enabling pulse from the gating unit 11 by way of switch 40. It will be understood that the pulses of FIG. 2e appear on the lines 19 collectively and for any one pulse, only one of the lines 19 is energised. Accordingly, only the corresponding modulator 20' is energised by that pulse.

Each modulator 20' operates, when it receives a pulse from the switch 40, to provide an output signal corresponding in amplitude to the instantaneous picture signal amplitude at that time. In this way, therefore, the pulses of FIG. 2e serve as sampling pulses for the picture signal of FIG. 2a. The corresponding sampled picture signal comprising a succession of pulses of varying amplitude is shown in FIG. 2f. The amplitude modulated envelope of the pulse signals corresponding to the signal of FIG. 2a, is reproduced as a dotted line in FIG. 2f. The picture signal of FIG. 2f appears on the output lines 51 collectively, each pulse appearing on one output line only corresponding to the position of switch 40 and the modulator 20' operating.

The average spacing of the pulses of the signal of FIG. 2f defines the compressed signal channel bandwidth required in the present practical system. Expressed otherwise, the initial signal bandwidth, and hence the clock pulse repetition interval and the ratios of the pulse rates corresponding to the different detail levels are so related that a considerably greater amount of information is carried by the transmission channel of restricted bandwidth, which is connected to terminal 52. This greater amount of information will normally be less than the theoretical maximum for that bandwith, but will always be greater than for a conventional picture signal, as at FIG. 2a, sent through that same channel of restricted bandwidth.

The switch 40 together with the delay system 50 operates to compress in time the original picture signal under conditions of low detail and to expand in time the original picture signal under conditions of high detail.

Returning now to FIG. 2, the combined pulse signals supplied to the switch 40 are shown in FIG. 2g, the sampling pulses on line 14 being shown in full lines and the clock pulses on line 15 being shown in broken lines. The amplitude modulation envelope of the original picture signal is again shown as a dotted line.

The partially compressed, partially expanded pulse picture signal arriving at the output of the delay system 50 and fed by line 58 to terminal 52 is represented in FIG. 2h.

It will be seen that FIG. 2h represents a more uniform distribution of signal pulses in time as compared with FIG. 2f and hence a more uniform transmission of information.

Experiment, using test pictures providing picture areas of varying definition from high-definition to low-definition has shown that the pulse chains of FIG. 2f or of FIG. 2h have, as a maximum, about 150 pulses per scan line whereas the original picture of FIG. 2a sampled at every interval T would represent a coded picture signal of 500 pulses per scan line. In this instance a compression of at least 3:1 is effected. That is, the picture detail can be adequately transmitted by a channel of ⅓ ×3 mc./s., i.e. 1.0 mc./s. bandwidth. The picture signal would not be transmitted in the pulse form of FIG. 2h, since a pulse-signal requires a channel of wide bandwidth for transmission. The signal of FIG. 2h might be passed through a low-pass filter to give the equivalent signal of small bandwidth, using an analogue transmission channel such as an amplitude-modulated or frequency-modulated carrier wave, or it might be fed to a pulse coding device, using a pulse code modulation transmission system. However, suitable intermediate devices forming a part of the transmission channel postulated are known and do not form part of the present invention.

It will be appreciated that the functioning of the system described above rests upon the assumption that the picture to be transmitted contains areas of other than the highest detail. This assumption is valid as a distribution of picture detail is an essential of an intelligible picture. Obviously, a picture signal representative solely of areas of maximum detail is not capable of compression by any system.

In the present system, large regions of high detail may cause the switch 40 ultimately to select the longest delay interval available by the delay system 50. A further consecutive signal pulse then overloads the system. To avoid unduly frequent overloading of the system, a large number of switch positions, modulators and input lines to the delay system is advantageously chosen. However, the number of alternative channels employed depends upon the statistical properties of pictures and any economic system will be designed to permit occasional overloading, but as infrequently as desired.

In the circumstances mentioned, when a high picture detail signal follows selection of the longest delay channel, the output signals to terminal 52 can only follow at the clock pulse frequency. Picture detail is then lost owing to the limited bandwidth of the transmission channel beyond terminal 52.

Equally, when a low picture detail signal follows selection of the shortest delay line, no further compression is possible, nor perhaps desirable. Pulses then appear at terminal 52 having a time interval corresponding to the greatest pulse interval 9T, as shown in FIG. 2f. No detail is lost in the transmitted picture signal but the system is then operating at a lower rate of information transmission than the rate which the restricted bandwidth permits. The system may then be said to be underloaded.

In order that the signal of FIG. 2h may be restored to the form of FIG. 2g and finally to the approximate form of FIG. 2a, information regarding the extent of time compression or expansion must be available at the receiving end of the system. Accordingly, the switch 40 provides a data signal which is also supplied by lines 19 to the modulator bank 20 and by lines 51 to the delay system 50 and thence by a line 59 to an output terminal 53.

The picture and data signals at terminals 52 and 53 respectively are then transmitted by any convenient transmission path comprising two transmission channels.

Figure 3:
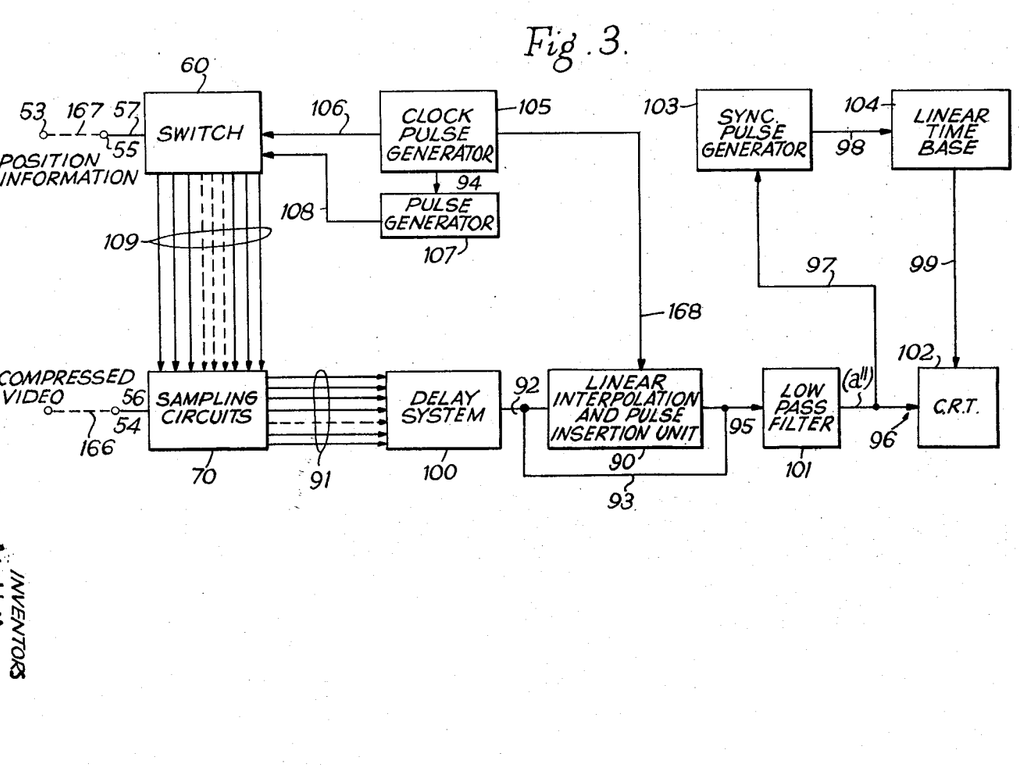
FIG. 3 is a block schematic diagram of the receiver part of the television system.

In FIG. 3, these two transmission channels are represented by the lines 166 and 167 respectively. These channels may in general be considered to include pulse coding devices, any radio frequency carrier generators and carrier modulation apparatus, the radio wave or other transmission path and any demodulation and signal separating apparatus forming part of the two transmission channels. For the purpose of describing this example, the video transmission channel 166 is assumed to include means, such as a low-pass filter, for converting the pulse signal of FIG. 2h into the corresponding signal of continuously varying amplitude. The signal arriving at terminal 54 is thus a signal of continuously varying amplitude, not a pulse signal. The position information signal arriving at terminal 55 is in the same form as the signal leaving terminal 53.

FIG. 3 further shows a general form of television receiver for reproducing the picture transmitted by the transmitter of FIG. 1.

Terminal 54 is connected by a line 56 to a sampling circuit unit 70. A clock pulse generator 105 is connected by a line 106 to the switch unit 60, by line 94 to a pulse generator 107 and by a line 168 to a linear interpolation and pulse insertion unit 90. The pulse generator 107 is connected by a line 108 to the switch 60.

Terminal 55 is connected by a line 57 to the switch 60 and the switch 60 is connected by a number of alternative lines 109 to the sampling circuits 70 which in turn are connected by lines 91 to the delay system 100. The delay system 100 is connected by a line 92 to a linear interpolation and by a line 93 to a low pass filter 101.

The linear interpolation and pulse insertion unit 90 is connected by a line 95 to the filter 101 which latter is connected by a line 96 to a receiver cathode ray tube 102 and by a line 97 to a synchronizing pulse generator 103. The synchronizing pulse generator is connected by a line 98 to a linear time-base 104, which latter is connected by a line 99 to the cathode ray tube 102.

The switch 60 is a multiple-position switch which selects one of the alternative lines 109. The lines 109 are connected each to a different part of the delay system 100 via a sampling circuit whereby a different delay is introduced for each line 109. The difference in overall delay between the parts of the delay system 100 selected by adjacent positions of the switch 60 is, in this example, a constant delay difference $d$.

The receiver of FIG. 3 operates in the following manner:

The variable amplitude picture signal arrives at terminal 54 and is fed to the sampling circuits 70.

The data signal, carrying information of the position of the transmitter switch 40, arrives at terminal 55 and is fed to the switch 60. This data signal controls the setting of the switch 60, so that the switch 60 is set in the corresponding position to the position of the switch 40. However, corresponding positions of the two switches 40, 60 select complementary delay intervals in the delay systems 50, 100 respectively, so that the overall delay provided by the delay system 50 together with that provided by the delay system 100 is always the same, whichever complementary pair of lines 51, 91 is chosen. Thus a pulse fed through the shortest delay part of the delay system 50 at the transmitter is fed through the longest delay part of the delay system 100 at the receiver and vice versa. In this way, the picture signal supplied to lines 92 and 93 is restored to the form shown in full lines in FIG. 2f and reproduced at FIG. 2i.

It is now required to fill in the empty pulse positions, shown as dotted vertical lines in FIG. 2g. The pulses passing along line 92 and illustrated by FIG. 2f are supplied to the linear interpolation and pulse insertion unit 90 and to the input of the low-pass filter 101. Should consecutive pulses arrive at unit 90 separated by 3T or 9T the unit measures the difference between the consecutive pulses and inserts pulses of the correct height, shown by the dotted vertical lines in FIG. 2g. The envelope of the ordinates of these pulses is linear as shown in FIG. 2j. The linear interpolation and pulse insertion unit 90 is supplied from the clock pulse generator 105 by line 168.

The reconstructed picture pulse signal is obtained by feeding the pulse signal of FIG. 2j to the filter 101 the output of which is a continuous signal of variable amplitude which is a close approximation to the starting picture waveform of FIG. 2a and is indicated on line 96 of FIG. 3 as ($a''$).

The final picture signal is fed by line 96 to the signal input of a cathode ray tube 102 to modulate the beam amplitude in the ordinary way. The synchronizing pulse generator 103 derives line and frame synchronizing pulses from the picture signal fed thereto by connection 97. These synchronizing pulses control the linear time base unit 104 from which line and frame deflection signals are supplied to the cathode ray tube 102 by line 99.

The various units shown in the block schematic diagrams of FIG. 1 and FIG. 3 will now be further described and explained.

The picture tube 1 and associated time base 2 are representative of the complete apparatus of a video signal generator of known type and require no further description. The output video signal from this picture signal generator comprises the picture information and the associated line and frame scanning synchronizing information. The video delay unit 5 can be any device capable of providing the required delay equally for all the frequency components of the video signal. In this example an electromagnetic delay line is used.

Figure 4:
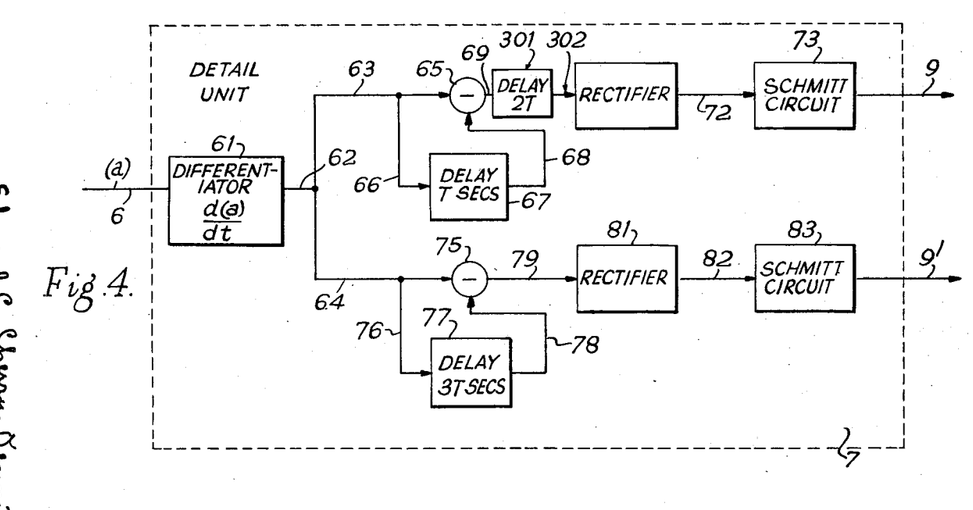
FIG. 4 is a block schematic diagram showing in detail a detail unit for the arrangement of FIG. 1.

The detail unit 7 of the transmitter of FIG. 1 is shown more fully in FIG. 4. For simplicity of explanation, a full circuit diagram is not given, since the unit can be fully understood from the block schematic diagram of FIG. 4, in which all of the component units represented by blocks are known in themselves.

The same mode of description is followed for the same reason in FIGS. 5, 6, 8, 9 and 10.

In FIG. 4, the line 6, carrying the picture signal of FIG. 2a, is connected to the input of a differentiating unit 61. The output of unit 61 provides a signal on line 62 which is the first differential with time of the picture signal input. The output line 62 is divided into two branches 63, 64. Branch 63 is connected to one input of a difference amplifier 65 and also, by way of line 66, to the input of a delay 67 which provides a delay of T seconds between its input and output terminals. The output of delay 67 is supplied by line 68 to the second input of the difference amplifier 65. The output of the difference amplifier 65 is supplied by line 69 to a delay unit 301 which provides a delay of 2T seconds and whose output feeds a rectifier 71 through line 302 and thence by line 72 to the input of a Schmitt circuit 73. The output of the Schmitt circuit 73 is supplied to line 9.

Branch 64 is connected to one input of a difference amplifier 75 and also, by way of line 76, to the input of a delay 77 which provides a delay of 3T seconds between its input and output terminals. The output of delay 77 is supplied by line 78 to the second input of the difference amplifier 75. The output of the difference amplifier 75 is supplied by line 79 to a rectifier 81 and thence by line 82 to the input of a Schmitt circuit 83. The output of the Schmitt circuit 83 is supplied to line 9'.

In operation, the differentiator 61 provides in its output signal the continuous first differential of the picture signal of FIG. 2a. The differentiated signal is then examined to determine the intervals between successive significant turning points. The differentiated picture signal waveform is examined continuously over an interval T by the combination of delay 67 and difference amplifier 65. Similarly, the differentiated waveform is examined continuously over an interval 3T by the combination of delay 77 and difference amplifier 75.

So long as the significant turning points in the picture signal of FIG. 2a follow at intervals lying between T and 3T an output is provided by both Schmitt circuits 73, 83 so that both lines 9, 9' are energised and the picture signal is sampled in the transmitter at the maximum rate, that is at every interval T. If the points of inflection follow at intervals lying between 3T and 9T, only line 9' is energised, from Schmitt circuit 83, and the picture signal is sampled in the transmitter at the medium rate, that is every interval 3T. If the points of inflection follow at intervals greater than 9T neither of the Schmitt circuits 73, 83 provides an output, neither line 9', 9 is energised and the picture signal is sampled at the minimum rate, that is every interval 9T.

The turning points in the picture signal are the points at which the slope of the signal changes significantly, i.e. they are points at which the modulus of the second differential of the picture signal $$\left[\frac{d^2}{dt^2}[v(t)]\right]$$

is a maximum.

The lines 9', 9 are connected to two of the three inputs of the gating unit 11 of FIG. 1. The third input is supplied by way of line 13 from the clock pulse generator 12.

Figure 5:
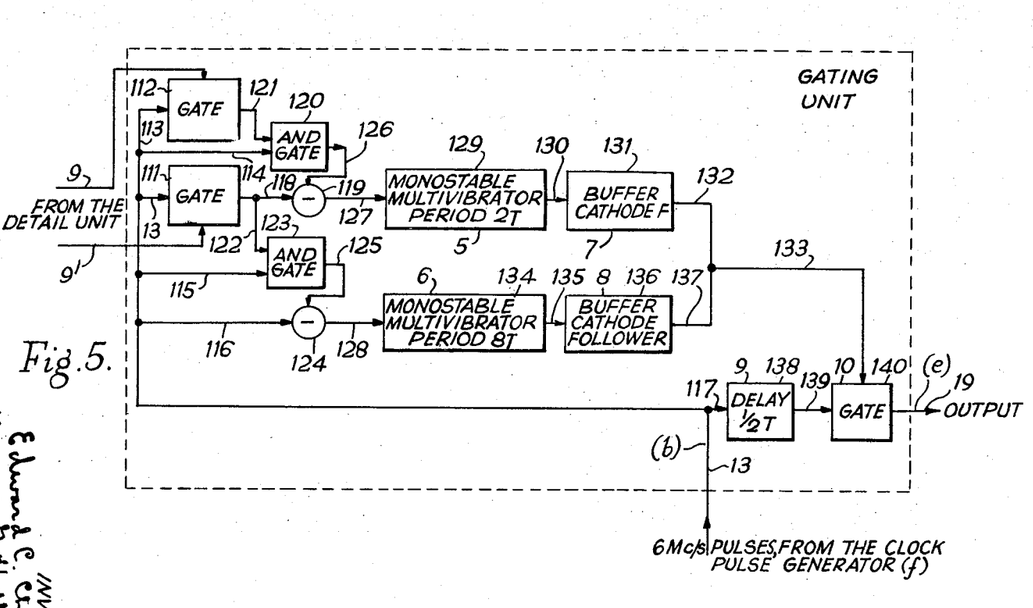
FIG. 5 is a block schematic diagram showing in detail a gating unit for the arrangement of FIG. 1.

In FIG. 5 which shows the gating unit 11 in greater detail the line 9' is connected to one input of a gate 111 and the line 9 is connected to one input of a gate 112. The second input of gate 111 is supplied with clock pulses by way of line 13. The clock pulse input is also supplied by line 13 to the gate 112, to an AND gate 120, by line 114, to an AND gate 123, by line 115, to a difference amplifier 124 and by line 116, to a delay unit 138 of delay time ½T by line 117.

The output of gate 111 is supplied by line 118 to one input of a difference amplifier 119. The output of gate 112 is supplied by line 121 to the second input of the AND gate 120, the output from which gate is supplied by line 126 to the second input of the difference amplifier 119.

The output of the difference amplifier 119 is supplied by way of line 127 to control a monostable multivibrator 129 for generating a waveform of mark period 2T. The output of the multivibrator 129 is fed by way of line 130, to a buffer cathode follower 131, line 132 and line 133 to one input of a gate 140.

The output of gate 111 is also supplied, by way of line 122 to the second input of the AND gate 123 and the output of gate 123 is supplied by line 125 to the second input of the difference amplifier 124.

The output of the difference amplifier 124 is supplied by way of line 128 to control a monostable multivibrator 134 for generating a waveform of mark period 8T. The output of the multivibrator 134 is fed by way of line 135, a buffer cathode follower 136, line 137 and line 133 to the input of gate 140.

The output of delay 138 is supplied by line 139 to the second input of the gate 140. The output of gate 140 is supplied to line 19.

The operation of the gating unit of FIG. 5 is as follows:

The gates 111 and 112 are normally shut and are opened by a signal on line 9' and line 9 respectively. For the lowest picture signal detail level requiring the lowest signal sampling rate, no signal appears on either line 9' or 9. Both gates 111 and 112 are closed and the clock pulses on line 13 pass by way of line 116, difference amplifier 124 and line 128 to initiate operation of multivibrator 134. The waveform of 8:1 mark-space ratio is supplied to gate 140 thereby inhibiting eight out of a series of nine clock pulses on line 139. After this operation, the multivibrator 134 resets, permitting the ninth clock pulse in sequence to pass to line 19 during the space period of the multivibrator waveform. This ninth clock pulse, which also appears on line 128, by way of line 13, line 116 and difference amplifier 124, initiates a further operation of the multivibrator 134, and so on so long as no signal appears on either line 9' or line 9. Clock pulses appearing at the input of multivibrator 134 during the 8T mark period have no effect.

With medium picture detail level requiring the medium signal sampling rate, a signal appears on line 9' only, so that gate 111 is opened and gate 112 remains shut. Clock pulses are supplied by way of line 13, gate 111 and line 122 to the AND gate 123. Coincident clock pulses on line 115 provide an output from AND gate 123 by line 125 to difference amplifier 124, thereby inhibiting the passage of clock pulses from line 116 to multivibrator 134.

With gate 112 shut, the AND gate 120 provides no output to difference amplifier 119, so that the clock pulses passed by gate 111 are also passed by difference amplifier 119 and fed by line 127 to initiate operation of multivibrator 129. The waveform of 2:1 mark-space ratio is supplied to gate 140 thereby inhibiting two out of a series of three clock pulses on line 139. After this operation, the multivibrator 129 resets, permitting the third clock pulse in sequence to pass to line 19, during the space period of the multivibrator waveform. So long as line 9' and only line 9 is energised, the clock pulses continue to arrive at multivibrator 129 by way of gate 111 and difference amplifier 119. The two clock pulses arriving during the mark period of the multivibrator waveform have no effect. The third clock pulse, which arrives during the space period, initiates a further operation of the multivibrator, and so on.

With maximum picture detail requiring the maximum signal sampling rate, signals appear on both lines 9' and 9. Both gates 111 and 112 are opened and clock pulses are passed to both AND gates 120 and 123. Since both AND gates 120 and 123 also receive the clock pulses by lines 114 and 115 respectively, both AND gates supply outputs to difference amplifiers 119 and 124 respectively. Neither difference amplifier 119 nor 124 provide an output, therefore, so that neither multivibrator 129 nor 134 are operated. No clock pulse inhibiting waveform is fed to gate 140 and every clock pulse on line 139 is fed to line 19.

The delay 138 between line 13 and line 139 compensates for the delay introduced by difference amplifier 119 and multivibrator 129 or by difference amplifier 124 and multivibrator 134, as the case may be, between line 13 and line 133.

Figure 6:
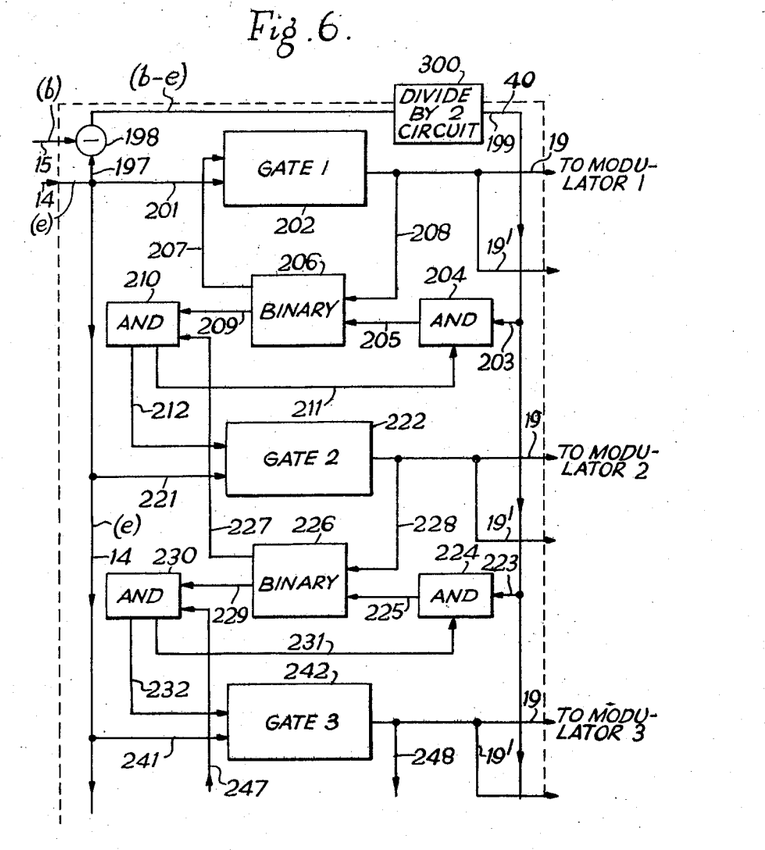
FIG. 6 is a block schematic diagram of a switch arrangement suitable for use in the arrangements of FIG. 1 and FIG. 3.

The switch 40 of the transmitter of FIG. 1 may have a number of alternative forms and the form used in the present example is explained in detail with reference to FIG. 6, which shows a part of the switch, the remainder being a repetition of the units shown. In FIG. 6, line 14 from the gating unit 11 supplies the signal of FIG. 2e to one input of all the gates of the switch. Line 14 is also connected by line 197 to one input of a difference amplifier 198. Line 15 from the clock pulse generator supplies the clock pulses of FIG. 2b to the other input of defference amplifier 198. The output of difference amplifier 198 corresponds to every empty clock pulse position. This signal is represented as $(b-e)$ in FIG. 6 and is supplied to a divide by two circuit, the output of which is supplied to one input of one AND gate associated with each switch position.

The signal of FIG. 2e on line 14 is supplied by line 201 to one input of a first gate 202, by line 221 to one input of a second gate 222, by line 241 to one input of a third gate 242 and so on. Line 199, from the difference amplifier 198 is connected by line 203 to one input of a first coincidence, or AND, unit 204, by line 263 to one input of a second coincidence unit 224 and so on.

The single output of each coincidence unit 204, 224 and so on is connected respectively by line 205, 225 and so on to one input of a corresponding bi-stable trigger, or binary, unit 206, 226 and so on. One output of binary unit 206 is connected by a line 207 to the second input of the corresponding gate 202. The corresponding output of each binary unit 226 and so on is connected by a line 227, 247 and so on to one input of the preceding coincidence, or AND, unit 210, 230 respectively, and so on. The output of each gate, 202, 222, 242 and so on is connected to one of the alternative lines 19 connected each to a modulator 20' of the modulator bank 20 of FIG. 1 and also by a line 208, 228, 248 and so on to the second input of the corresponding binary unit 206, 226 and so on. The second output of each binary unit 206, 226 and so on is connected by a line 209, 229 and so on to one input of the second series of coincidence or AND units 210, 230 and so on.

One output of each AND unit 210, 230 and so on is connected by a line 211, 231 and so on to the second input of the corresponding AND unit of the first series 204, 224 and so on. The second output of each AND unit 210, 230 and so on is connected by a line 212, 232 and so on to the next following gate unit 222, 242 and so on, that is, AND unit 210 is connected to gate 222, AND unit 230 is connected to gate 242 and so on.

The switch 40 operates in the following manner:

If the picture signal of FIG. 2e comprises a sampling pulse following a sampling pulse in consecutive clock pulse positions, the switch 40 operates to introduce additional delay, that is, if the first of the two pulses is switched by way of, say, modulator 3 to the corresponding input of the delay system 50, the following pulse is switched by way of modulator 4 to the next input to the delay system thus providing a longer delay by the incremental interval $d$.

The switch 40 consists essentially of a series of gates 202, 222, 242 and so on feeding the respective output lines 19. Initially, say, all gates but gate 202 are closed and gate 202 is open. The first pulse arriving by line 14 is switched to modulator 1. A pulse is also fed by line 208 to the binary unit 206 and thence back to the gate 202 by line 207 thus switching the gate 202 to the closed state. The second output from binary unit 206 is fed by line 209 to the AND unit 210 and thence by line 212 to the next gate 222 which gate is thereby switched to the open state. The following signal pulse is thus switched to modulator 2. Coincidently, a pulse is fed by line 228 to binary unit 226, by line 227 to AND unit 210 thereby sending a pulse by line 212 to gate 222 to switch this gate to the closed state. Coincidently, the second output from binary unit 226 is fed by line 229 to AND unit 230 and thence a pulse is sent by line 232 to gate 242 to open this next gate. A signal pulse following in the next pulse position is thus switched to modulator 3 and so on, each pulse in the next pulse position to the preceding pulse opening the gate following, so that a pulse in the next following pulse position is switched to the next longer delay in sequence.

The switch 40 also operates so that when an empty pulse position is followed by an empty pulse position, the switch is set to the line 19 connected through a modulator to the next shorter delay in sequence. This switching operation is effected by pulses from the difference amplifier 198 supplied by line 199. Suppose, for example, gate 222 is open to pass a signal pulse to modulator 2. If there is no signal pulse in the next following two pulse positions, the difference amplifier 198 supplies two pulses on line 199. These are fed to a divide by two circuit which emits a pulse for every second pulse it receives then by lines 203, 223 and so on to the AND units 204, 224 respectively and so on. However, these pulses can only trigger the binary preceding the open gate, in this case binary unit 206. This arises from the connection of one output of each binary unit to one input of the preceding AND unit. In the present instance AND unit 204 receives coincident pulse inputs by line 203 and line 211, so that gate 222 is now closed and gate 202 switched to the open state. Thus, in this example, each second pulse from the difference amplifier 198 following the preceding pulse in consecutive clock pulse positions, representing empty signal pulse positions, switches the input on line 17 to the next shorter delay position.

Thus the switch position remains unchanged if a signal pulse and two empty pulse positions occur consecutively, the signal pulse moves the switch to the next longer delay position, in the manner explained, and the following pulse from the divide by two circuit returns the switch to its former position.

As shown in FIG. 6, each output line 19 has a branch 19'. When any output line 19 carries a pulse to the modulator bank 20, the corresponding branch 19' also carries the pulse to the position information generator 21.

Figure 7:
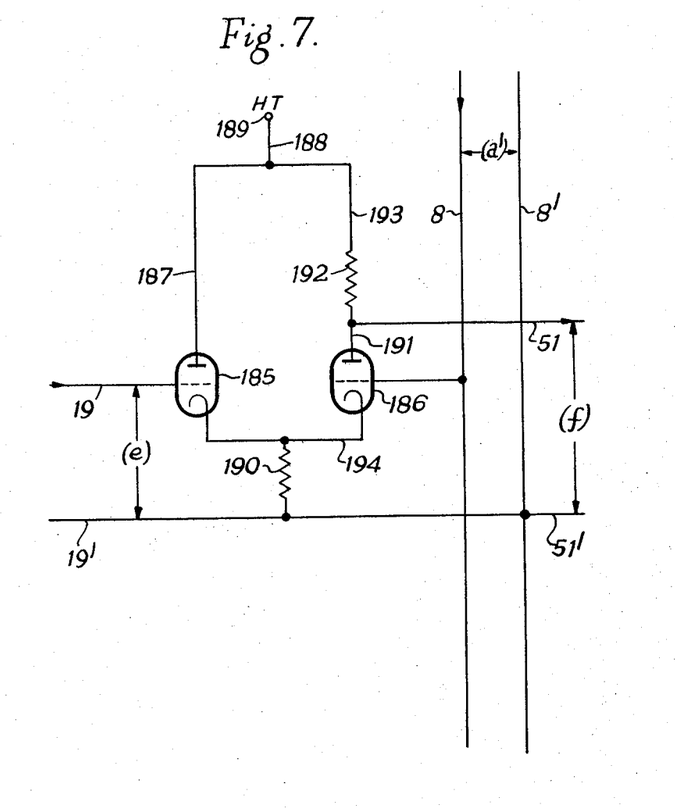
FIG. 7 is a schematic circuit diagram of a modulator forming one unit of a modulator bank for use in the arrangement of FIG. 1.

FIG. 7 shows a single modulator unit 20' forming one of the channels of the modulator bank 20 of FIG. 1. In FIG. 7 the lines 8, 19 and 51 of FIG. 1 all comprise a pair of conductors, the conductors 8', 9' and 58' forming the second conductor of the pair and being a common earth line. In each case the signal appears between the line 8, 19 or 51 and the common line.

Line 19 is connected to the control grid of a triode 185 having a common cathode coupling 194 with a similar triode 186. The anode of triode 185 is connected by line 187 and line 188 to a high-tension supply at terminal 189. A common cathode load resistor 190 is connected between line 194 and line 19', 51'. The anode of triode 186 is connected by way of line 191, an anode load resistor 192, line 193 and line 188 to the high-tension supply at terminal 189.

In the absence of a pulse on line 19, valve 185 is conducting and the value of resistor 190 is sufficient to render valve 186 non-conducting. A pulse on line 19 is applied to valve 185 in the negative sense and biases the valve back to cut off. By the elimination of the potential drop across resistor 190, valve 186 is biased to its normal working position and functions as an amplifier. The output signal at the anode of valve 186 corresponds in amplitude to the amplitude of the picture signal of FIG.

2a at the instant of the sampling pulse input. This output picture signal is as shown in FIG. 2f.

Figure 8:
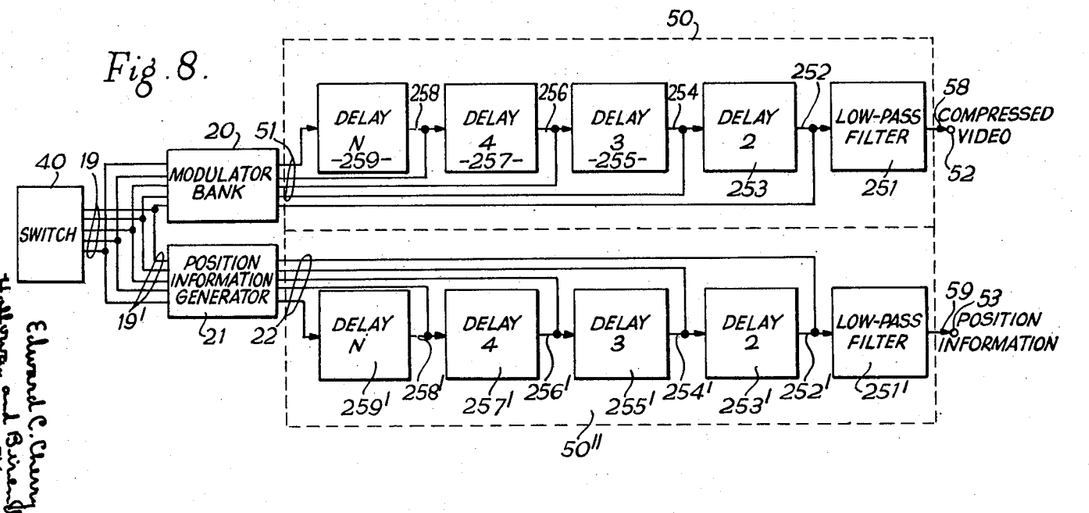
FIG. 8 is a block schematic diagram showing in detail on delay system suitable for use in the arrangement of FIG. 1.

One suitable form of the delay system 50 of FIG. 1 is shown in greater detail in FIG. 8. In FIG. 8, the multiple-way connection 19 from the switch 40 to the modulator bank 20 and the multiple-way connections 19' to the position information generator 21 are shown as in FIG. 1.

The delay system 50 comprises two similar parts 50 and 50″. The lines 51 from the modulator bank 20 supply the part 50 and the lines 22 from the position information generator supply the part 50″.

The part 50 of the delay system comprises an output low-pass filter 251 the output of which is fed by line 58 to terminal 52. The input of filter 251 is connected by line 252 to the output of delay 253, the input of which is connected by line 254 to the output of delay 255. The input of delay 255 is connected by line 256 to the output of delay 257 and so on, the broken line 258 indicating a number of serially connected delays the end delay of which is 259.

The corresponding elements of the delay part 50″ are similarly arranged and are indicated by the same reference numerals distinguished by a dash.

The lines 51 are led to the serial connections between the low-pass filter 251 and the delays 253, 255, 257—259. The line 51 leading to the junction of filter 251 and the output of delay 253 corresponds to the line from modulator 1 in FIG. 1. The line 51 leading to the input of delay 253 corresponds to the line from modulator 2 in FIG. 1, that the input of delay 255 corresponds to the line from modulator 3 and so on.

In the arrangement of FIG. 8, "delay 1" is represented solely by the incidental delay introduced by the filter 251. Switching to position modulator 2, delay 2 causes the signal pulse to be supplied instead to the input of delay 253 which introduces an incremental delay d. Each delay 255, 257—259 introduces a further delay d, so that each consecutive switch position corresponds to an incremental delay d.

The signal pulses are switched by switch 40 by way of modulator bank 20 into delay system part 50 from which they pass to terminal 52. Delay system part 50″ operates in the corresponding manner, so that the switch position information pulse experiences the same delay as the signal pulse to which it corresponds and reaches terminal 53 by line 59 at the same instant.

The delays 253, 255, 257—259 and the delays 253', 255', 257'—259' may be electromagnetic delays or electronic delays or a combination of both and include the required compensating amplifiers for each delay.

As previously stated, the position information data may be a pulse or pulse chain which identifies the switch position. However, in this example, the pulse is derived by applying each sampling pulse to an amplifier and variable-step amplitude limiter, not shown in the figure, to derive a pulse which indicates the switch position according to the pulse amplitude. The amplitude of each pulse arriving at terminal 53 thus indicates the delay of the signal pulse arriving simultaneously at terminal 52.

In the receiver of FIG. 3, the clock pulse generator 105 operates to produce pulses with the repetition interval T and is synchronised thereto by a separate synchronizing channel, not shown. The pulse generator 107 is controlled by the clock pulse generator 105 to produce pulses with the repetition interval 3T. The sampling circuits 70 have the form of the modulator shown in FIG. 7, the two inputs to the control grids of the triodes 185, 186 thereof being supplied by lines 56 and 108. At the instant of each input pulse, the incoming variable amplitude picture signal is sampled and a pulse, corresponding in amplitude to the instantaneous amplitude of the picture signal, appears at the anode of triode 191 and is supplied by line 109 to the switch 60.

The switch 60 has a form such that its position is set according to the amplitude of the position information arriving by terminal 55 and line 57, so that switch 60 is always set to the corresponding position of switch 40 of the transmitter. The pulses arriving every 3T by line 108 are thereby switched to delay system 100 via sampling circuits 70 to provide the complementary delay of delay system 50. The resultant picture signal pulses on line 92 are as shown in FIG. 2i.

The delay system 100 may comprise a series arrangement of delays each introducing an incremental delay d exactly similar to the delay system part 50 of FIG. 8.

In the receiver of FIG. 3, the picture signal is restored substantially to its original form by expansion or compression in the receiver to compensate respectively for the compression or expansion introduced in the transmitter. The empty clock pulse positions of the signal of FIG. 2i are then filled in by the linear interpolation and pulse insertion unit 90. The restored pulse picture signal is represented in FIG. 2j. To recover substantially the variable-amplitude picture signal of FIG. 2a, the pulse signal of FIG. 2j is passed through the filter 101. The restored picture signal is then fed to the receiver cathode ray tube 102, the picture area of the tube being scanned by means of a linear line time-base 104.

Figure 9:
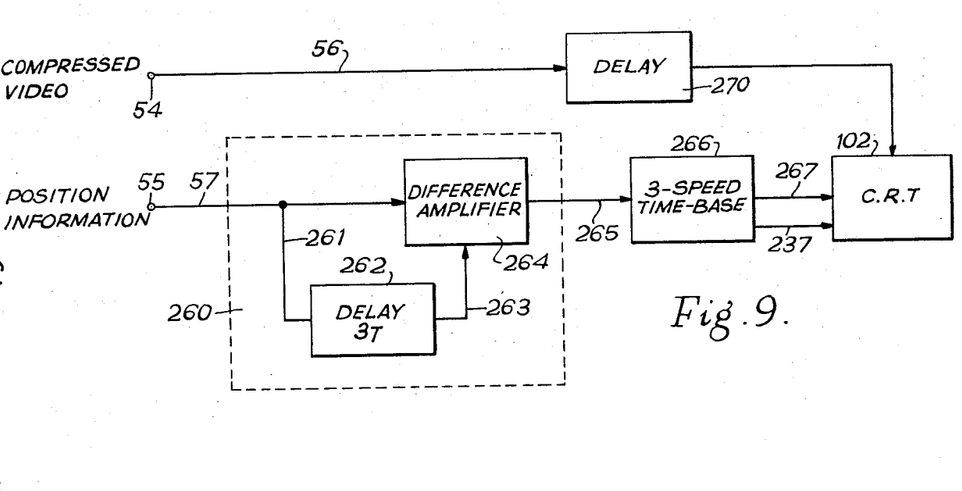
FIG. 9 is a block schematic diagram showing a modified form of receiver to that shown in FIG. 3.

An alternative receiver arrangement is shown in FIG. 9, in which arrangement the original picture signal is not restored, but the original picture is reformed by feeding the compressed picture signal to the receiver cathode ray tube and by using a three-speed line time-base, by means of which compressed parts of the picture signal are expanded by scanning at a greater linear speed and expanded parts of the picture signal are compressed by a slower scanning speed.

In FIG. 9, the picture signal input terminal 54 is connected by line 56 to a delay 270 and thence by line 236 to the input of the cathode ray tube 102. The necessary line amplifiers are omitted from the figure for simplicity.

The position information is first supplied to a pulse comparison unit 260. The position information is supplied to the input of a difference amplifier 264 and by a line 261 to the input of a delay 262. The output of the delay 262 is connected by a line 263 to the second input of the difference amplifier 264. The output of the difference amplifier 264 is connected by a line 265 to a three-speed line time-base 266 which, in turn, supplies the tube 102 by way of a line 267. The usual frame time-base and synchronizing pulse generator are omitted for simplicity.

The delay 262 introduces a delay equal to one pulse interval 3T, so that the difference amplifier continuously compares each position information pulse with the preceding one. If the comparison indicates a change of setting of the transmitter switch 40 to a shorter delay setting, that is picture signal compression, the output of the difference amplifier 264 is a signal which switches the three-speed time-base 266 to its higher scanning velocity setting. A comparison of consecutive position information pulses indicating an increased delay, that is picture signal expansion, conversely sets the time-base 266 to its lower scanning velocity setting. A comparison of consecutive pulses indicating no change of delay time restores the time-base 266 to its normal medium velocity setting.

The variable velocity time-base 266 tends to introduce an unwanted brightness modulation of the spot of the cathode ray tubes 102. This tendency is corrected by providing a compensating signal to the modulating electrode of the cathode ray tube 102. This compensating signal is derived from the scanning waveform of time-base 266 and is supplied to the cathode ray tube 102 by way of a line 237.

In FIG. 9, the pulse comparison unit 260 is shown as part of the receiver. However, the comparison unit 260 will be contained normally in the transmitter between the delay system 50″ and the output terminal 53.

The various units shown in the transmitter of FIG. 1 and the receivers of FIG. 3 and FIG. 9 may take a number of different forms while still providing, in combination, the overall operation described.

Figure 10:
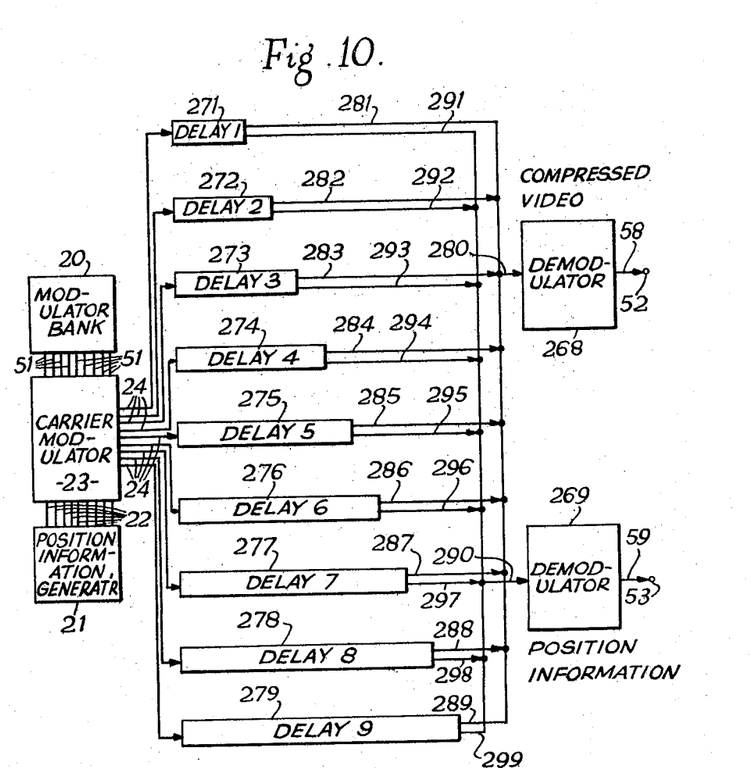
FIG. 10 is a block schematic diagram showing a modified delay system to that shown in FIG. 8.

By way of further example, an alternative form of the delay system 50 of FIG. 1 to that described in detail with reference to FIG. 8 is shown in FIG. 10. In this arrangement, both the picture pulse and the corresponding switch position information pulse are modulated on to a common carrier wave so that the pulses pass together through the delay part selected by the setting of switch 40 and the two pulses are separated by suitable demodulators at the output of the delays.

In FIG. 10, the modulator bank 20 and position information generator 21 are as in FIG. 1, but the multiple-way lines 51 from the modulator bank 20 and the corresponding lines 22 from the position information generator 21 are both connected to inputs of a carrier modulator unit 23. The alternative lines 24 from the carrier modulator 23 are connected each to the input of one of nine delay lines 271 to 279. Each delay line supplies two demodulators which separate the picture and position information pulses and supply each to a separate output line. The delay lines 271 to 279 have their picture signal outputs connected by lines 281 to 289 to line 280 and by line 280 to the input of a demodulator 268. The delay lines 271 to 279 also have their position information signal outputs connected by lines 291 to 299 to line 290 and by line 290 to the input of a demodulator 269. The output of demodulator 268 is connected by line 58 to output terminal 52 and the output of demodulator 269 is connected by line 59 to output terminal 53.

Referring now to the output lines 19 of the switch embodiment shown in FIG. 6, the output line 19 marked modulator 1 results in a connection to delay line 271, which is correspondingly marked "delay 1"; the output line 19 marked "modulator 2" results in a connection to delay line 272, which is correspondingly marked "delay 2" and so on. Each delay line 272 to 279 provides a delay time which exceeds by the constant difference $d$ the delay time of the line of next lower reference number. The length of each of the delay lines 271 to 279, as drawn in FIG. 10, is representative of the relative delay time introduced by that delay line.

In one embodiment of the invention, further means are provided, in association with the switch 40, to restore the switch setting to a preferred position at the beginning of each line scan. The object of such setting is to avoid the switch position drifting, whereby, at the beginning of a line scan, it eventually becomes set disadvantageously to provide either the minimum or the maximum delay.

A further modification provides for an initial setting of switch 40 at the beginning of a line scan, or at some preferred shorter or longer period, which is offset from the middle delay setting by an amount which is determined from the picture detail content in the preceding line or lines scanned. The object again is to avoid the switch setting reaching and resting at either extreme delay position.

It will be evident from the preceding explanation of the invention that with a restricted number of delay settings, available for selection by the switch 40, the detail of a particular picture may be such that the setting of switch 40 will reach and rest at one or other extreme position of the associated delay unit.

In the most likely case, that corresponding to continuous scanning of a picture area containing little or no detail, the switch position corresponding to the shortest delay time may be reached. The picture signal for a picture region of little or no detail will be pulse sampled at intervals of 9T. So long as the switch 40 is able to step successively to a shorter delay line position, the system operates normally. However, when the last switch position, corresponding to the shortest delay time, is reached, the system is then "underloaded." Pulses spaced at intervals of 9T will continue to arrive and pass through the shortest of filter 251 of FIG. 8 or of delay 271 of FIG. 10 and will be transmitted from terminal 52. This video signal will be distorted because the pulses of interval 9T will be passed through the low-pass filter 251 of FIG. 8 or the demodulator 268 of FIG. 10 of bandwidth $$f_c = \frac{1}{2 \times 3T}$$

This difficulty may be overcome by ensuring that when the system does underload pulses arrive every 3T seconds apart at the input to gate 202 only by inserting extra pulses should the normal interval between successive pulses be 9T.

What we claim is:

1. A signal transmission system for transmitting a signal having periods of high information content, and periods of low information content by a transmitting channel of insufficient information capacity to accommodate the signal during the periods of high information content, having a transmitter comprising signal generating means for generating a variable-amplitude signal, a transmitter output terminal, sampling means for sampling the variable-amplitude signal at controlled intervals and deriving an amplitude modulated pulse signal therefrom, a clock pulse generator for generating clock pulses corresponding to the shortest signal sampling intervals, a detail unit having the variable-amplitude signal supplied thereto and providing a quantized output signal according to the information content level thereof, pulse division means supplied with clock pulses from said clock pulse generator and controlled by said quantized output signal to provide sampling control pulses at short intervals when said quantized output signal corresponds to a higher information content level and longer intervals when said quantized output signal corresponds to a lower information content level, said sampling control pulses being supplied to the sampling means to determine said controlled intervals, a delay system connected intermediately of said signal sampling means and said transmitter output terminal and having step-wise variable delay adjustment, delay system adjusting means supplied with said sampling control pulses and operative in the sense to progressively increase the delay for successive amplitude modulated signal pulses when said sampling control pulses follow at short intervals and to progressively decrease the delay for successive amplitude modulated signal pulses when said sampling control pulses follow at long intervals and a position information generator for generating a signal representative of said delay system adjustment.

2. A signal transmission system as claimed in claim 1, having a transmitter wherein said detail unit provides a quantized signal having one of three alternative forms identifying, respectively, periods of high information content, periods of medium information content, and periods of low information content in the said variable-amplitude signal and said delay system adjusting means adjusts the delay system to increase incrementally the delay time of the amplitude modulated pulse signal during periods of high information content, decrease the incremental delay time of the said pulse signal during periods of low information content and leave unchanged the delay time of the said pulse signal during periods of medium information content.

3. A signal transmission system as claimed in claim 2, in which said pulse division means comprises a gating unit controlled by the information content level signal to inhibit all but one clock pulse of a successive plurality of clock pulses to provide sampling control pulses at a medium and a low sampling rate, corresponding respectively to periods of medium and low information content, alternatively to the said clock pulses, corresponding to periods of high information content.

4. A signal transmission system as claimed in claim 3, in which the said delay system has an output terminal and a plurality of alternative input terminals, consecutive input terminals corresponding to a constant incremental delay time and said delay system adjusting means includes multiple-position switch means controlled from said gating unit by successive sampling control pulses at the high sampling rate to supply the said amplitude modulated pulse signal successively to consecutive alternative delay system input terminals for increased delay time, by successive sampling control pulses at the low sampling rate to supply the said pulse signal successively to consecutive alternative delay system input terminals for decreased delay time and by successive sampling control pulses at the medium sampling rate to supply the said pulse signal successively to the same delay system input terminal.

5. A signal transmission system as claimed in claim 4, having a transmitter comprising a modulator bank with a modulator unit for each position of the multiple-position switch, each modulator unit having two inputs and one output, multiple lines one for each switch position connecting one input of each modulator to each multiple-position switch output, a line supplying the said variable-amplitude signal to the second input of every modulator unit and a line connecting the output of each modulator unit to one input terminal of the delay system, each modulator unit operating to supply an output signal pulse corresponding in amplitude to the instantaneous amplitude of the said variable amplitude signal input at the instant of receiving a sampling control pulse by way of the multiple-position switch.

6. A signal transmission system as claimed in claim 4, in which the said position information generator has multiple input terminals one connected to each multiple-position switch output, multiple output terminals one connected to each of the delay system input terminals, the position information generator operating to supply an output signal at the output terminal corresponding to the input terminal supplied with an input pulse from the multiple position switch, said output signal defining the input terminal energised and being fed to the corresponding delay system input terminal as said signal sampling pulse.

7. A signal transmission system as claimed in claim 6, in which the delay system comprises two similar variable delay channels each with corresponding alternative input terminals, one channel carrying the said amplitude modulated pulse signal, the other channel carrying the signal from the position information generator, each delay system channel supplying a separate transmitter output terminal, selection of the corresponding input terminals of the two delay channels providing the same time delay for signals at each of the two transmitter output terminals.

References Cited in the file of this patent
UNITED STATES PATENTS

| | | |
|---|---|---|
| 2,115,894 | Watson | May 3, 1938 |
| 2,911,465 | Toulon | Nov. 3, 1959 |